(12) United States Patent
Chittipeddi

(10) Patent No.: US 6,615,195 B1
(45) Date of Patent: Sep. 2, 2003

(54) METHOD AND SYSTEM FOR EVALUATING TECHNOLOGY TRANSFER VALUE

(75) Inventor: Sailesh Chittipeddi, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/458,608

(22) Filed: Dec. 10, 1999

(51) Int. Cl.[7] .............................................. G06F 17/60
(52) U.S. Cl. ..................................................... 705/400
(58) Field of Search .............................. 377/15; 705/7, 705/8, 10, 51, 52, 400

(56) References Cited

U.S. PATENT DOCUMENTS

| | | | |
|---|---|---|---|
| 4,977,594 A | 12/1990 | Shear | 705/53 |
| 5,923,834 A | 7/1999 | Thieret et al. | 714/25 |
| 5,999,907 A | 12/1999 | Donner | 705/1 |
| 6,336,035 B1 | 1/2002 | Somoza et al. | 455/446 |

FOREIGN PATENT DOCUMENTS

| | | |
|---|---|---|
| JP | 11-66140 | 3/1999 |

OTHER PUBLICATIONS

Fast et al: "The effects of consumer education on consumer search"; Journal of Consumer Affairs, Summer 1989, vol. 23, No. 1 p. 65.

Nichols, Nancy, "Scientific Management at Merck: An Interview with CFO Judy Lewent", Harvard Business Review, Jan.–Feb. 1994, pp. 89–97.

*Primary Examiner*—Edward R. Cosimano

(57) ABSTRACT

A Method and computer implemented system may be used to value knowledge-based property such as documents, databases, spreadsheets or research and development related information or studies. Intangible property may be valued by analyzing stored data representing accesses by users to a medium containing a copy of the knowledge-based property, estimating a pattern of the accesses by users to the medium containing the copy of the knowledge-based property using a statistical model, and assigning a value to the knowledge-based property based on the pattern. The data may comprise the total number of times the copy of the knowledge-based property has been accessed and a time-date stamp for each access event. The assigned values for a plurality of knowledge-based properties may then be used as bases for making decisions such as apportioning budget resources among tasks or projects related to the knowledge-based properties or apportioning availability of limited computer resources for storing shared documents.

39 Claims, 2 Drawing Sheets

METHOD AND SYSTEM FOR EVALUATING TECHNOLOGY TRANSFER VALUE

FIELD OF THE INVENTION

The present invention is related to the valuation of properties, particularly to the valuation of knowledge-based properties.

DESCRIPTION OF THE RELATED ART

The traditional sales of goods and services permit a relatively simple assessment of the values of the goods and services transferred between the buyers and sellers. According to traditional economic theory, a seller should price his or her goods (or services) at an equilibrium price, such that the quantity of goods the seller is willing to supply at that price equals the quantity buyers are willing to purchase at the same price. Even if fixed costs and overhead must be covered by the price, values can easily be calculated for each transfer or group of transfers using conventional accounting methods. These calculated values can then be used as bases for future decisions concerning the goods and services. For example, predictions of future value and related budgeting and marketing decisions can be based on calculations utilizing the value of the transferred goods and services.

Problems arise, however, when one tries to value knowledge-based properties (or intellectual property), such as documents, databases, spreadsheets, research and development related information, or studies, that are not sold or licensed on the open market. These knowledge-based properties are frequently shared within a corporation, university, professional association, religious institution, or the like. When no license or transfer of title to the knowledge-based property or a copy thereof occurs, and no money changes hands, the laws of supply and demand cannot be relied on to determine the value of the knowledge-based property.

Because valuation of these knowledge-based properties is difficult, decisions associated with these knowledge-based properties also become very difficult. For instance, it is often difficult to apportion a research and development (R&D) budget to reflect the value of documents or data produced by the R&D projects. Likewise, it is often difficult to apportion availability of limited computer resources for storing shared documents and data.

Therefore, there is currently a need for a method for assigning values to knowledge-based properties in order to support the decision-making process.

SUMMARY OF THE INVENTION

The present invention is a method of valuing knowledge-based property including the steps of analyzing data representing accesses by users to a medium containing a copy of the knowledge-based property, estimating a pattern of accesses by users to the medium containing the copy of the knowledge-based property by using a statistical model, and assigning a value to the knowledge-based property based on the pattern.

The above and other advantages and features of the present invention will be better understood from the following detailed description of the preferred embodiments of the invention which is provided in connection with the accompanying drawings.

DETAILED DESCRIPTION

Figure 1:
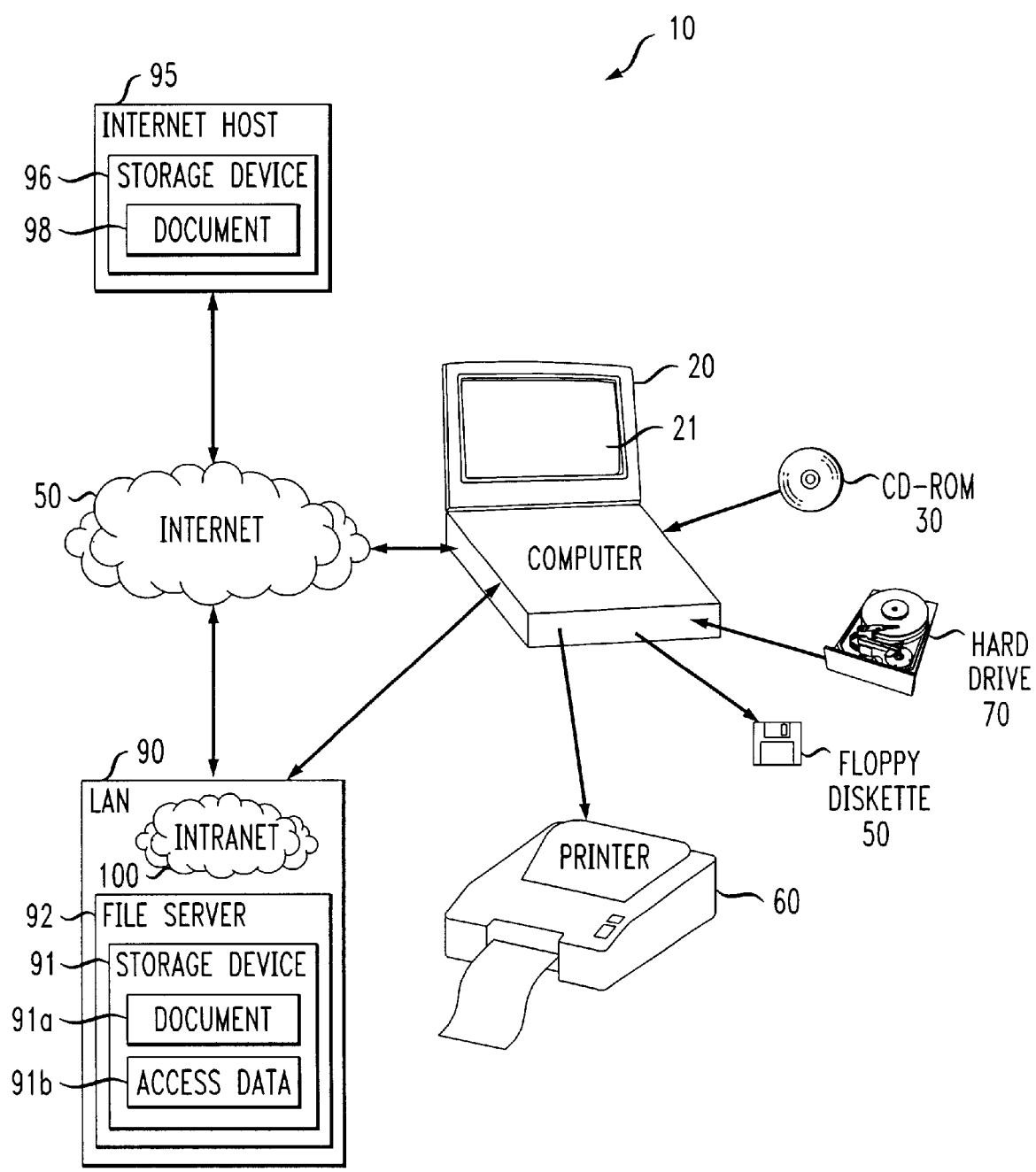
FIG. 1 is a block diagram of an exemplary system for valuing knowledge-based property.
Figure 2:
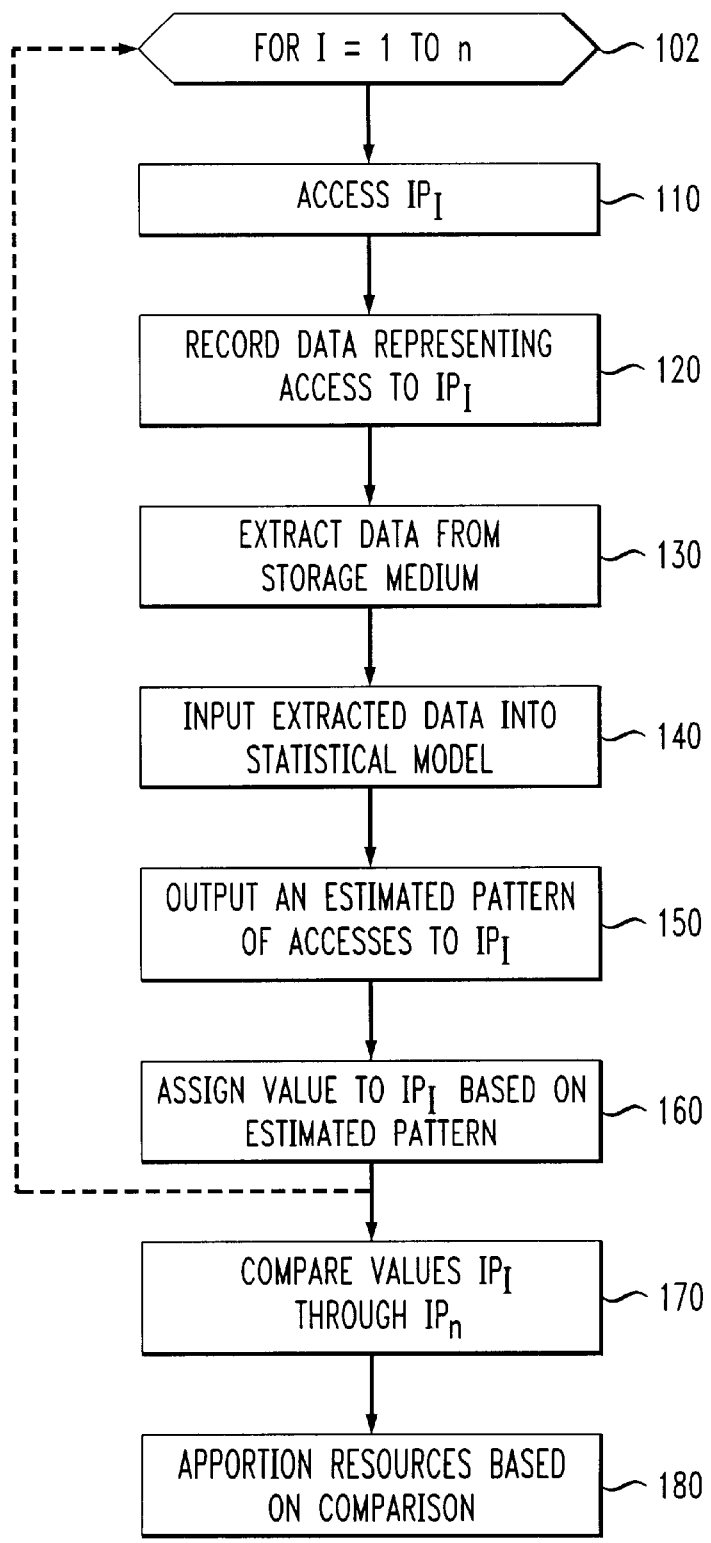
FIG. 2 is a flow chart diagram of an exemplary method of valuing a plurality of knowledge-based properties in order to make decisions based on the assigned values.

FIG. 1 shows a system 10 for valuing knowledge-based property. FIG. 2 shows an exemplary method according to the invention by which knowledge-based property can be valued. Data representing accesses by users to a medium containing a copy of the knowledge-based property are analyzed. A pattern of the accesses by users to the medium containing the copy of the knowledge-based property is estimated by using a statistical model. A value is assigned to the knowledge-based property based on the pattern. The implementation of this method is discussed below.

The invention is particularly advantageous for apportioning fixed, limited resources among a plurality of projects or workers, based on relative (as opposed to absolute) values of the knowledge-based properties associated with those projects or workers. With the total budget fixed, and relative values for each project determined, the total budget can be allocated without evaluating an absolute or intrinsic value of each project.

In a simple example, consider the allocation of a $100,000 research budget to two projects. Project A produces 10 documents that are accessed a total of 15,000 times. Project B produces 10 documents that are accessed a total of 5,000 times. The budget could be allocated as follows: $75,000 for project A and $25,000 for project B, in proportion to the number of accesses to the documents associated with each project.

The relative values assigned to a plurality of knowledge-based properties may also be used to rank those knowledge-based properties. Decisions may then be based on the ranks of the values of the knowledge-based properties. For example, assume a business has decided that it only has sufficient resources to continue four projects from a group of ten projects. Each project has one or more knowledge-based properties associated with it. A knowledge-based property may be associated with a project, for example, by being a product or service of the project or by being related to the project. The business may use the invention to assign relative values to the knowledge-based property associated with each project. The knowledge-based properties can then be ranked, highest to lowest, based on their relative values. This ranking may then be used to determine that the projects associated with the four highest ranked knowledge-based properties should share the limited resources.

Many types of knowledge-based property may be valued using the system of FIG. 1 and method of valuing knowledge-based property shown in FIG. 2. Embodiments of the invention may be used to value knowledge-based properties such as: data sheets, R&D related documents, experimental data, theoretical documents, whether they be scientific, academic, religious, political or otherwise, surveys, blueprints, maps, compilations, code segments, instructions, manuals, diagrams or customer lists, to name a few, or related services.

As used herein the term knowledge-based property refers to intellectual property or intangible property, regardless of whether stored in a fixed, non-volatile medium. Thus, a document would still be considered a knowledge-based property for the purpose of the present application, even though fixed in a tangible medium, such as paper. It should be understood that the knowledge-based property being valued is intangible by nature in that, primarily, it is the concept embodied in a tangible medium that is being valued. The actual medium containing the knowledge-based property, whether it be computer-readable (e.g., a diskette) or hard copy (e.g., paper), may or may not be valued.

Further, although the exemplary method and system may be more advantageous for assigning values to properties that are not sold or licensed, the exemplary method may also be practiced to assess values of assets that heave been sold or licensed. In another variation, a weighted values may be generated, taking into account both actual sales (or license) price and an estimated value based on access data.

FIG. 1 shows an exemplary embodiment of a system 10 for implementing the method of valuing knowledge-based property according to the invention. A conventional computer 20 executes a computer program. The computer program may be stored on a computer-readable medium encoded with computer program code for executing the steps of the method of valuing knowledge-based property. The computer-readable medium for storing the computer program may be, for example, a hard drive 70 or CD-ROM 30, but may be any conventional medium such as a programmable ROM or floppy diskette 50.

The system 10 also includes a computer-readable medium (e.g. hard drive 91) having data 91b stored thereon. The data 91b represent accesses by users to a computer-readable medium 91 containing a copy 91a of the knowledge-based property. It should be understood that medium 91 may store copies of a plurality of knowledge-based properties and that data 91b may reflect this. The knowledge-based property to be valued may be stored on any conventional computer-readable medium 91 such as (but not limited to) a hard drive or CD-RW drive or RAM of a file server 92. Alternatively, the storage medium for the data may be any conventional data storage medium such as floppy data diskette 50 but removable media are less preferred, because it is more difficult to track access to a removable medium. The stored data 91b may be organized in a conventional data file format. An output device, such as a diskette 50, printer 60 or display 21, is also depicted for outputting results from computer 20.

FIG. 2 is a flow chart of an exemplary method of valuing knowledge-based property in the system of FIG. 1. At step 102, the main loop is repeated for each of a plurality of knowledge-based properties ($IP_1$ through $IP_n$). At step 110, a knowledge-based property 91a is accessed by a user. At step 120, data 91b representing the access event are recorded. At step 130, data 91b representing the accesses to $IP_1$ through $IP_n$ are read from the storage medium 91. At step 140, the access data 91b are input to a statistical model. At step 150, a pattern of accesses, is estimated by applying the statistical model to the data. At step 160, values may be assigned to $IP_1$ through $IP_n$. At step 170, after $IP_1$ through $IP_n$ have been assigned values, these values may be compared and used as the bases for decisions related to these knowledge-based properties. At step 180, resources (e.g., budget money or file server 92 space) may be allocated based on the relative values of the knowledge-based properties. For example, funds from a budget may be apportioned among tasks or projects related to the knowledge-based properties according to the relative values of those knowledge-based properties as determined from the access data 91b. The budget may be, for example, a research and development budget or an academic departmental budget. The decision made in step 180 could likewise be related to non-budgetary decisions such as discontinuing an area of research or a practice group in a business.

In order for the system of FIG. 1 to execute the method of valuing knowledge-based property encoded as a computer program on hard drive 70, data 91b representing accesses to a copy of the knowledge-based property, which may be stored on storage device 91, are recorded. In one embodiment of the invention, each time a copy 91a of the knowledge-based property stored on storage device 91 is accessed, data 91b representing that access are stored in a record, which may be located in storage device 91 on the server 92. An access may occur, for example, when a user of computer 20, or any other computer connected to LAN 90 or Intranet 100, opens or copies the copy 91a of the knowledge-based property stored on storage device 91. Conversely, an access may occur when a user accesses a copy 98 of a knowledge-based property on the storage device 96 of a host 95 via the Internet 80. Also, an access to copy 91a or copy 98 of a knowledge-based property may occur through a wireless unit, such as a cellular telephone or other wireless Internet access tool. Essentially, anytime a knowledge-based property is made available to a user, an access event may occur, leading toe the recording of access data.

In one embodiment of the invention, after an access to the copy 91a of the knowledge-based property stored on storage device 91 occurs, data 91b may be recorded in the storage device 91 representing the time at which the access occurred. The time may be represented to any desired precision.

In another embodiment of the invention, the recorded data 91b may include the number of times the copy 91a of the knowledge-based property has been accessed during the time period it has been accessible. The access data 91b may be updated each time the copy 91a of the knowledge-based property is accessed, thereby maintaining a current set of data 91b representing accesses to the knowledge-based property. For example, the data 91b may be recorded as a data file containing a list of the time-date stamps for each access and a count of the total number of accesses. Methods for counting the number of accesses to a stored copy of a knowledge-based property, such as a document 98 accessible through a website, are well known. These counters are often prominently displayed on websites accessed via the Internet 80 and are updated each time that the website is accessed.

In another preferred embodiment of the invention, the data 91b may comprise the Internet protocol address (IP address) of the Internet users that access the document 91a or document 98. This information may be very helpful in identifying the users, such as by company or institution name, that are accessing the knowledge-based property.

In a preferred embodiment of the invention, the data 91b representing the accesses are used to estimate a pattern of accesses by users to the medium 91 containing the knowledge-based property. A statistical model may be used to accomplish this pattern determination. Many statistical models exist for estimating patterns based on observed data. In one embodiment of the invention, the data 91b representing the accesses may be modeled according to the average number of accesses for a given period of time, such as average accesses per week over the period that the copy 91a of the knowledge-based property stored on device 91 has been accessible. The time period of accessibility may be calculated by examining the first access time recorded in the access data 91b and the most recent time recorded. The period of accessibility may likewise be calculated from the first time the copy 91a of the knowledge-based property was made accessible to the present time when the pattern is being modeled. The average accesses per week is calculated by dividing the total number of accesses to a copy 91a of the knowledge-based property (a number that may be stored in the access data 91*b* on the storage device 91 of file server 92) by the number of weeks contained in the period of accessibility. The average is then the estimated pattern for the accesses to the copy of the knowledge-based property.

In another embodiment of the invention, the estimated pattern may be created using conventional regression models, e.g., linear regression, using the method of least squares, or polynomial regression. The estimating of a pattern from observed data, such as access data 91*b*, according to regression techniques is well known. Similarly, a conventional multiple regression modeling technique could be used to estimate a pattern of accesses when several independent variables besides time are used as inputs for the statistical model. For example, another possible variable for use in a multiple regression model may be an economic climate indicator. Thus, the estimated pattern of accesses could be a function of time and the economic indicator.

The pattern of accesses estimated using the statistical model may be used to extrapolate a number of accesses for some future period. For example, if a linearly increasing or decreasing pattern is estimated for the total number of accesses per week during a series of weeks, the number of accesses per week in a future week can be calculated using the linear pattern. The model thus affords an estimation of the number of future accesses that can be expected.

The estimating of a pattern of accesses to the stored copy 91*a* of the knowledge-based property enables a value to be assigned to the knowledge-based property. A pattern that exhibits a large or increasing number of accesses may support assigning a large value to the knowledge-based property, whereas a pattern that depicts a small or decreasing number of accesses may support assigning a smaller value to the knowledge-based property. If a plurality of knowledge-based properties are assigned values, as shown in the method of FIG. 2, these values may be normalized to assist in comparing the values. "Normalization" as defined herein means adjusting the observed data to correct for such factors as the length of time each property is available, the size of the population that has access to each resource, and the like. It is recognized that each knowledge-based property may become accessible at different points in time. Values may be assigned to the knowledge-based properties based on the current trends of accesses determined from their respective estimated patterns. However, if the knowledge-based properties have not all been accessible for the same periods, it may be helpful to normalize the values by only considering data or trends discernible from the patterns, after a standard predetermined period of accessibility. For example, accesses to all documents during their first month of availability may be ignored. Conversely, the patterns may be examined at similar points during the knowledge-based properties' respective periods of accessibility, thereby valuing the knowledge-based properties at similar points of "maturity." Normalization may also be useful to account for disparities in populations having access to the knowledge-based properties. The value assigned to a knowledge-based property with an access population ⅓ that of a second knowledge-based property may be adjusted, for example by tripling the assigned value, in order to facilitate comparisons between the values of the two knowledge-based properties.

Alternatively, a weighting scheme may be used in conjunction with a statistical model. For example, certain periods of availability may be given more weight for a knowledge-based property that has been accessible for an extended period of time. Accesses during the first few months (or years, etc. . . .) of availability may be weighted less when counting the number of accesses or estimating a pattern of accesses, thereby de-emphasizing initial interest in the knowledge-based property and valuing the knowledge-based property based on its longevity or staying power.

In another embodiment of the present invention, the valuation method may be applied to a plurality of knowledge-based properties stored on a system in which resources are limited such that copies of every knowledge-based property cannot be made available at all times. For example, if disk space on storage device 91 of file server 92 for storing shared documents is or becomes limited, the assigned values can be used to apportion this finite resource. The access data 91*b* identifying the times of day at which each copy of a knowledge-based property has been accessed may be used, in conjunction with the data 91*b* identifying the number of times each copy 91*a* of the knowledge-based property has been accessed, to estimate patterns of accesses and to assign values to each knowledge-based property. Data may also be tracked for each of the knowledge-based properties for different time periods (e.g., first shift v. second shift, weekday v. weekend.). Using these values, the finite resource can be apportioned among a plurality of knowledge-based properties, thereby providing greatest accessibility to the most valuable knowledge-based properties. For example, if a medium is to store a copy of a first knowledge-based property for a first period of time and a copy of a second knowledge-based property during a second period of time, the relative lengths of the first period of time and the second period of time may be based on the assigned values given to the first and second knowledge-based properties respectively. Also, the actual times at which the copies of the knowledge-based properties are made available may be based on the knowledge-based properties' relative values during different periods of the day, week, month or the like.

It should be understood that the computer program implementing the method of valuing knowledge-based property stored on hard drive 70 may be encoded in a computer data signal embodied in a carrier frequency wave. This computer data signal may be tnansferred to the computer 20 through a data line, such as when electronic information is sent from one computer to another over the Internet 80.

The present invention can be embodied in the form of methods and apparatus for practicing those methods. The present invention can:also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provided a unique device that operates analogously to specific logic circuits.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method of valuing a knowledge-based property comprising the following steps:
   analyzing data representing accesses by users to a medium containing a copy of the knowledge-based property;
   estimating a pattern of the accesses by users to the medium containing the copy of the knowledge-based property using a statistical model; and
   valuing the knowledge-based property based on the pattern, wherein the knowledge-based property is assigned a worth.

2. The method of valuing knowledge-based property of claim 1, wherein the medium containing the copy of the knowledge-based property is accessed via the Internet.

3. The method of valuing knowledge-based property of claim 1, wherein the copy of the knowledge-based property is stored on an intranet or a server of a local area network.

4. The method of valuing knowledge-based property of claim 1, further comprising the step of updating the data representing accesses by users each time the knowledge-based property is accessed.

5. The method of valuing knowledge-based property of claim 1, further comprising the step of recording the data representing accesses by users on a computer-readable medium.

6. The method of valuing knowledge-based property of claim 1, wherein the data comprise the times at which the medium containing the copy of the knowledge-based property is accessed by users.

7. The method of valuing knowledge-based property of claim 1, wherein the data comprise the number of times the medium containing a copy of the knowledge-based property is accessed by users.

8. The method of valuing knowledge-based property of claim 1, wherein the knowledge-based property is selected from a group consisting of a document, a database and a spreadsheet.

9. The method of valuing knowledge-based property of claim 1, wherein the method is performed to assign worths to a plurality of knowledge-based properties.

10. The method of valuing knowledge-based property of claim 9, further comprising the step of permitting access to a medium containing a copy of a first knowledge-based property and a copy of a second knowledge-based property for a first period of time and a second period of time respectively, the relative lengths of the first period of time and the second period of time being based on the assigned worths given to the first and second knowledge-based properties respectively.

11. The method of valuing knowledge-based property of claim 9, further comprising the step of apportioning a budget among a plurality of projects or tasks based on the assigned worths of the plurality of knowledge-based properties.

12. The method of valuing knowledge-based property of claim 11, wherein the budget is a research and development budget.

13. A computer-readable medium encoded with a computer program code for causing a processor to value a knowledge-based property, the medium comprising:
   means for causing the processor to analyze data representing accesses by users to a medium containing a copy of the knowledge-based property;
   means for causing the processor to estimate a pattern of the accesses by users to the medium containing the copy of the knowledge-based property using a statistical model; and
   means for causing the processor to value the knowledge-based property based on the pattern, wherein the knowledge-based property is assigned a worth.

14. The computer-readable medium of claim 13, further comprising means for causing the processor to record the data representing accesses by users on a computer-readable medium.

15. The computer-readable medium of claim 13, further comprising means for causing the processor to update the data representing accesses by users each time the knowledge-based property is accessed.

16. The computer-readable medium of claim 13, wherein the data comprise the times at which the medium containing the copy of the knowledge-based property is accessed by users.

17. The computer-readable medium of claim 13, wherein the data comprise the number of times the medium containing a copy of the knowledge-based property is accessed by users.

18. The computer-readable medium of claim 13, wherein the computer-based medium includes means for causing the processor to assign worths to a plurality of knowledge-based properties.

19. The computer-readable medium of claim 18, further comprising means for causing the processor to permit access to a medium containing a copy of a first knowledge-based property and a copy of a second knowledge-based property for a first period of time and a second period of time respectively, the relative lengths of the first period of time and the second period of time being based on the assigned worths given to the first and second knowledge-based properties respectively.

20. The computer-readable medium of claim 18, further comprising means for causing the processor to apportion a budget among a plurality of projects or tasks based on the assigned worths of the plurality of knowledge-based properties.

21. The computer-readable medium of claim 20, wherein the budget is a research and development budget.

22. A computer data signal embodied in a carrier wave encoded with computer program code for causing a processor to value a knowledge-based property comprising:
   means for causing the processor to analyze data representing accesses by users to a medium containing a copy of the knowledge-based property;
   means for causing the processor to estimate a pattern of the accesses by users to the medium containing the copy of the knowledge-based property using a statistical model; and
   means for causing the processor to value the knowledge-based property based on the pattern, wherein the knowledge-based property is assigned a worth.

23. The computer data signal of claim 22, further comprising means for causing the processor to record the data representing accesses by users on a computer-readable medium.

24. The computer data signal of claim 22, further comprising means for causing the processor to update the data representing accesses by users each time the knowledge-based property is accessed.

25. The computer data signal of claim 22, wherein the data comprise the times at which the medium containing the copy of the knowledge-based property is accessed by users.

26. The computer data signal of claim 22, wherein the data comprise the number of times the medium containing a copy of the knowledge-based property is accessed by users.

27. The computer data signal of claim 22, wherein the computer data signal includes means for causing the processor to assign worths to a plurality of knowledge-based properties.

28. The computer data signal of claim 27, further comprising means for causing the processor to permit access to a medium containing a copy of a first knowledge-based property and a copy of a second knowledge-based property for a first period of time and a second period of time respectively, the relative lengths of the first period of time and the second period of time being based on the assigned worths given to the first and second knowledge-based properties respectively.

29. The computer data signal of claim 27, further comprising means for causing the processor to apportion a budget among a plurality of projects or tasks based on the assigned worths of the plurality of knowledge-based properties.

30. The computer data signal of claim 29, wherein the budget is a research and development budget.

31. A system for valuing a knowledge-based property comprising:
   means for storing data representing accesses by users to a medium containing a copy of the knowledge-based property;
   means for analyzing the data representing accesses by users to the medium containing the copy of the knowledge-based property;
   means for estimating a pattern of accesses by users to the medium containing the copy of the knowledge-based property using a statistical model; and
   means for valuing the knowledge-based property based on the pattern, wherein the knowledge-based property is assigned a worth.

32. The system of claim 31, further comprising means for recording the data representing accesses by users on a computer-readable medium.

33. The system of claim 31, further comprising means for updating the data representing accesses by users each time the knowledge-based property is accessed.

34. The system of claim 31, wherein the data comprise the times at which the medium containing the copy of the knowledge-based property is accessed by users.

35. The system of claim 31, wherein the data comprise the number of times the medium containing a copy of the knowledge-based property is accessed by users.

36. The system of claim 31, wherein the value assigning means assigns worths to a plurality of knowledge-based properties.

37. The system of claim 36, further comprising means for causing the processor to permit access to a medium containing a copy of a first knowledge-based property and a copy of a second knowledge-based property for a first period of time and a second period of time respectively, the relative lengths of the first period of time and the second period of time being based on the assigned worths given to the first and second knowledge-based properties respectively.

38. The system of claim 36, further comprising means for apportioning a budget among a plurality of projects or tasks based on the assigned worths of the plurality of knowledge-based properties.

39. The system of claim 38, wherein the budget is a research and development budget.

* * * * *